(12) United States Patent
Gardes

(10) Patent No.: US 8,638,548 B2
(45) Date of Patent: Jan. 28, 2014

(54) HOUSING FOR ATTACHMENT TO A FLAT PANEL DISPLAY

(76) Inventor: François-Xavier Gardes, London (GB)

( * ) Notice: Subject to any disclaimer, the term of this patent is extended or adjusted under 35 U.S.C. 154(b) by 122 days.

(21) Appl. No.: 12/739,975

(22) PCT Filed: Oct. 27, 2008

(86) PCT No.: PCT/GB2008/003646
§ 371 (c)(1),
(2), (4) Date: Jul. 7, 2010

(87) PCT Pub. No.: WO2009/056814
PCT Pub. Date: May 7, 2009

(65) Prior Publication Data
US 2010/0271764 A1 Oct. 28, 2010

(30) Foreign Application Priority Data
Oct. 29, 2007 (GB) .................................. 0721189.9

(51) Int. Cl.
H05K 5/00 (2006.01)
H05K 7/00 (2006.01)
G06F 1/16 (2006.01)
A47F 5/00 (2006.01)
A47F 7/00 (2006.01)
F16M 11/00 (2006.01)
F16M 13/00 (2006.01)

(52) U.S. Cl.
USPC ............ 361/679.23; 361/679.21; 361/679.22; 248/122.1; 248/917

(58) Field of Classification Search
USPC .......... 361/679.21–679.23; 248/205.1, 309.1, 248/917–919, 924, 122.1; 348/789, 794, 348/836, 843; D14/336, 371, 374–375; D34/28
See application file for complete search history.

(56) References Cited

U.S. PATENT DOCUMENTS

| | | | | |
|---|---|---|---|---|
| 5,699,338 A | * | 12/1997 | Leung | 720/609 |
| 6,958,903 B1 | * | 10/2005 | Henry | 361/679.21 |
| 6,997,525 B2 | | 2/2006 | Gillengerten | |
| 7,159,053 B1 | * | 1/2007 | Lakin | 710/62 |
| 7,533,862 B2 | * | 5/2009 | Wu et al. | 248/442.2 |
| 7,589,959 B2 | * | 9/2009 | Ikeda | 361/679.21 |
| 7,719,832 B2 | * | 5/2010 | Kobara et al. | 361/679.58 |
| 7,864,515 B2 | * | 1/2011 | Numata et al. | 361/679.21 |
| 8,191,837 B2 | * | 6/2012 | Chen et al. | 248/176.1 |
| 2002/0135975 A1 | | 9/2002 | Schmidt | |
| 2002/0171774 A1 | | 11/2002 | Lee | |
| 2005/0247707 A1 | | 11/2005 | Tseng et al. | |

(Continued)

FOREIGN PATENT DOCUMENTS

CN 2006/20034221.1 5/2006
EP 1648167 A1 4/2006
(Continued)

OTHER PUBLICATIONS

Hitachi LED TV DVD Combination (date unknown).

*Primary Examiner* — Anthony Haughton
(74) *Attorney, Agent, or Firm* — Novak Druce Connolly Bove + Quigg LLP

(57) ABSTRACT

A device (10) for mounting behind a flat panel visual display (e.g. a television) (D) with a retractable means (17). The retractable means (17), in the form of a bay or tray, is extended to be accessible by a user when the flat panel display is mounted to a wall or the like.

9 Claims, 5 Drawing Sheets

(56) References Cited

U.S. PATENT DOCUMENTS

| | | | |
|---|---|---|---|
| 2005/0258333 A1* | 11/2005 | Wu et al. | 248/682 |
| 2008/0048984 A1* | 2/2008 | Ikeda | 345/168 |
| 2008/0099646 A1* | 5/2008 | Kobara et al. | 248/309.1 |
| 2009/0294599 A1* | 12/2009 | Chen et al. | 248/65 |
| 2010/0321876 A1* | 12/2010 | Liu et al. | 361/679.22 |
| 2011/0063789 A1* | 3/2011 | Ma et al. | 361/679.21 |
| 2011/0292581 A1* | 12/2011 | Lin et al. | 361/679.21 |

FOREIGN PATENT DOCUMENTS

| | | |
|---|---|---|
| JP | 2003077606 A | 3/2003 |
| WO | WO-2005/101820 A1 | 10/2005 |
| WO | WO-2006/014051 A1 | 2/2006 |
| WO | WO-2006/126126 | 11/2006 |

* cited by examiner

HOUSING FOR ATTACHMENT TO A FLAT PANEL DISPLAY

TECHNICAL FIELD

The present invention relates to a housing for use with a flat panel display such as a computer screen or television.

BACKGROUND ART

Flat panel displays are common for entertainment or computer applications and, as a consequence, an internationally recognised standard has been implemented to provide guidelines for mounting these devices. The VESA-FDMI (Video Electronics Standards Association—Flat Display Mounting Interface) Standard lists a range of square/rectangular screw patterns as follows:

TABLE 1

| | |
|---|---|
| MIS-D 75 | 75 mm × 75 mm |
| MIS-D 100 | 100 mm × 100 mm |
| MIS-E | 200 mm × 100 mm |
| MIS-F | 200 mm × 200 mm |
| | 400 mm × 400 mm |
| | 600 mm × 200 mm |
| | 600 mm × 400 mm |
| | 800 mm × 400 mm |
| | 280 mm × 150 mm |

These screw patterns may be applied to wall or other mounting devices.

It is now somewhat common for televisions to be accompanied by other peripheral devices including set-top boxes (digital decoders) or media players. Mounting such devices can either have aesthetic consequences for the television itself (if visible from a frontal perspective) or, when attaching a housing or other device to the back of a large flat panel display, it can be difficult to access. When mounted to a wall this difficulty for access is due to the display obscuring the housing from view. If there is only a small clearance then the edges of the housing may not be reachable (e.g. by a user's fingers). Even if the device can be reached, there may not be sufficient space to activate controls or make adjustments.

DISCLOSURE OF THE INVENTION

The present invention preferably seeks to utilise the VESA-FDMI Standard for the attachment of an additional housing or enclosure to the back of a flat panel display. Such a housing is generally intended to enclose one or more electronic devices and should be as accessible as possible from the front or side of the screen.

In a broad aspect the present invention provides a device for mounting behind a flat panel display with a retractable and/or extendable means to extend to be accessible by a user when the flat panel display is mounted.

The retractable/extendable means should be interpreted as having an extendable nature that can move toward and away from the device but may be fixed in place after being extended.

Preferably the device is a housing for attachment between a flat panel display and a mounting surface, wherein the housing has a VESA-FDMI hole pattern.

Preferably the housing includes first and second opposing walls, each having a matching VESA-FDMI pattern to permit fasteners therethrough, between the display and the mounting.

Preferably there is a supporting interface around each hole of the VESA-FDMI pattern. This support is preferably a billet.

Preferably the retractable means is a bay or tray that extends for use and retracts for storage into the device.

MODE(S) FOR CARRYING OUT THE INVENTION

Figure 1:
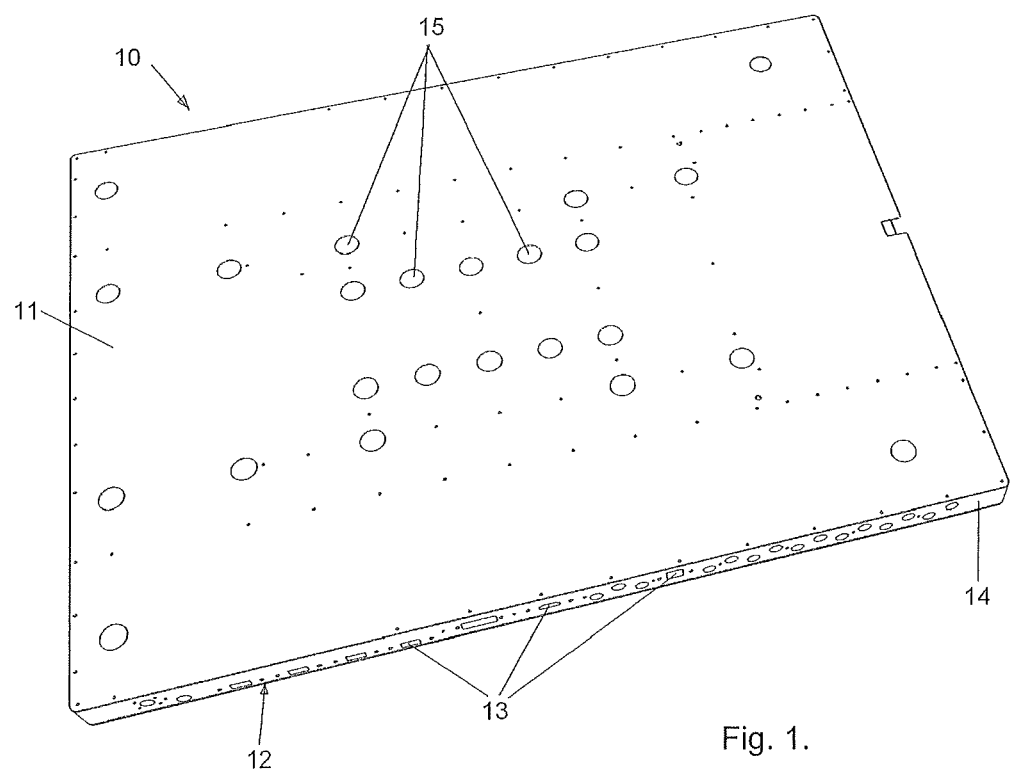
FIG. 1 shows a general view of a housing featuring a VESA-FDMI pattern.

A housing according to the present invention and illustrated by FIG. 1 is generally intended to enclose electronic components such as a computer system or embedded system. Such systems may have hard disk drives, optical disc drives, flash memory (and/or external reader), USB, various Input/Outputs and/or AV ports.

Housing 10 includes first and second walls 11 and 12 forming a relatively shallow structure. Various ports 13 are visible on a surrounding edge wall 14. Housing 10 therefore has the appearance of a shallow rectangular box-shape component.

FIG. 1 also clearly shows a screw-hole pattern 15 based on the VESA-FDMI standard. It is intended that screws extend all the way through housing 10 for mounting a flat panel display to a wall or other structure (e.g. a mounting bracket). There will usually be four of the holes utilised depending on the standard pattern provided behind the flat panel display.

Figure 2:
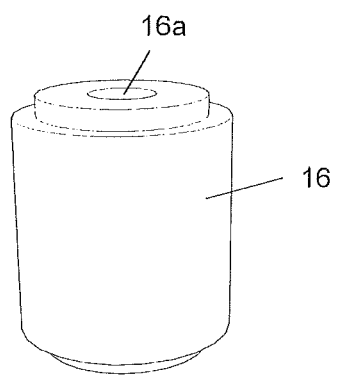
FIG. 2 shows a close up view of a supporting billet.

To prevent housing 10 being crushed by mounting of the display screen to a wall, billets 16 (e.g. of aluminium) are used, as illustrated by FIG. 2.

For each big hole that corresponds to a different VESA-FDMI dimension, there is one of these billets 16 aligned with said hole within housing 10. Screws can pass through billets 16 (via a thru-hole 16a that may be threaded or not) to mount housing 10 between a wall and the display.

Figure 3:
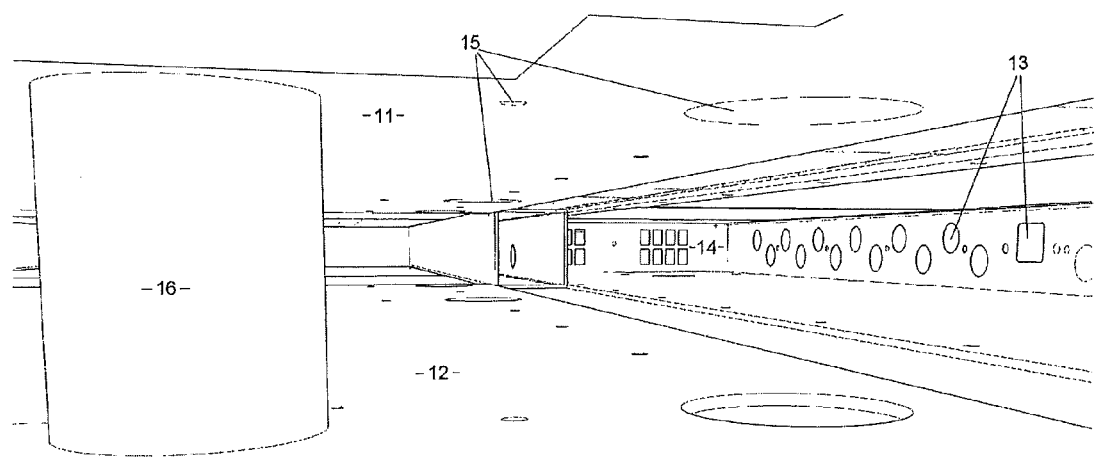
FIG. 3 shows an interior view of the housing showing the billet of FIG. 2.

FIG. 3 illustrates an interior view of housing 10 where a billet 16 appears as a pillar support. Since a screw or other fastener passes directly through the billet, walls 11 and 12 will not be crushed together under any pressure applied by that screw/fastener. Furthermore, walls 11 and 12 are maintained at a regular distance.

Figure 4:
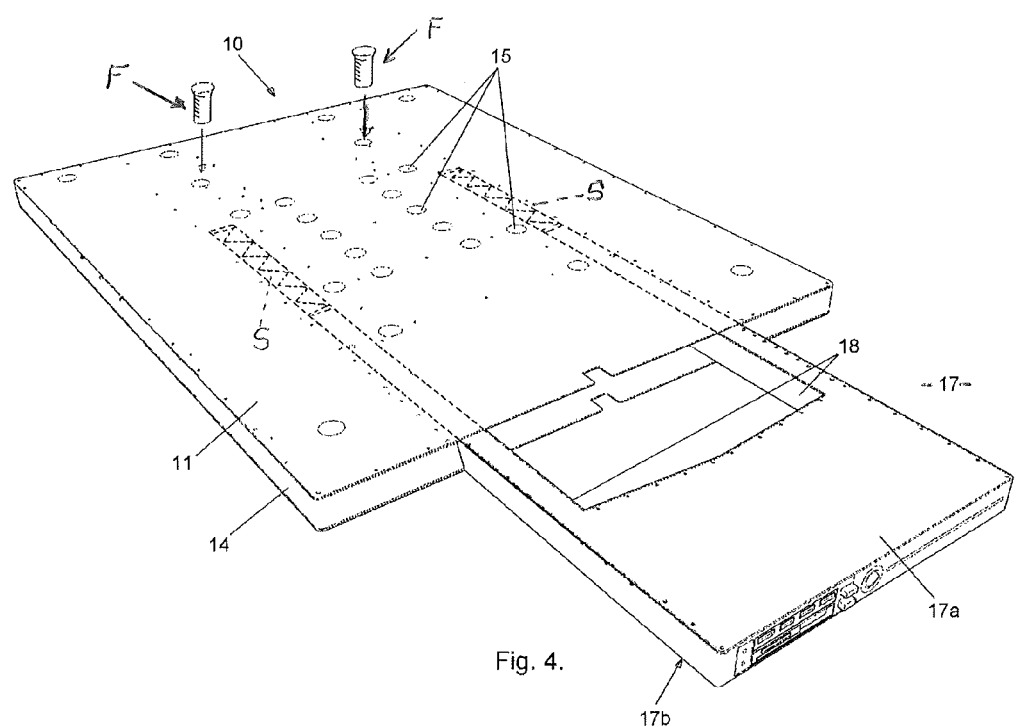
FIG. 4 shows a general view of a device according to the invention.

FIG. 4 illustrates the invention where a retractable means shown in the form of a tray 17, extends from the edge wall 14.

In the preferred embodiment the tray 17 is supported by two legs 18 extending into housing 10. Various electronic devices and/or interfaces can be arranged for being retractable via tray 17. Such devices may be an optical drive (CD, DVD etc.), flash memory reader, USB hub, AV ports or other button controls.

The retractable means may also be in the form of one or several "bays" that host devices, not necessarily but probably to standardised sizes. It will be apparent that the retractable means may utilise a ball bearing or other sliding mechanism.

FIG. 4 also illustrates that the retractable/extendable bay or tray slides into and/or out of the device with a spring bias S. FIG. 4 further illustrates the housing walls having a hole pattern to permit fasteners F to be inserted therethrough.

Figure 8:
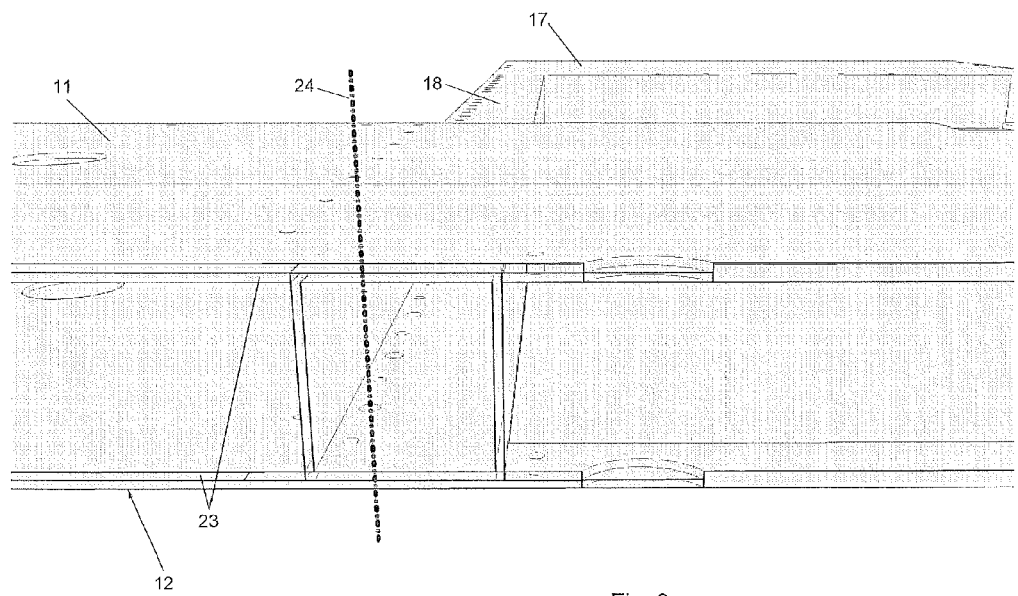
FIG. 8 shows a close up view of the sliding mechanism.

Preferably tray 17 fits tightly into housing 10 with top and bottom covers (17a/17b) cut from an internal panel that matches walls 11 and 12 (see FIG. 8). Such a mechanism is simple and saves space/thickness. It also has the advantage of preventing vibrations and noise because the components are perfectly matched. However, it should be noted that, in the intended application as a computer system enclosure, tray 17 will not need to be accessed particularly often during its service life.

Alternatively tray 17 can be configured to be spring loaded to release and extend tray 17 following a single inward press and then lock in place again when being returned into housing 10.

Tray 17 is illustrated as extending from a VESA-FDMI compatible housing 10 as described with reference to FIGS. 1 to 3, however, this aspect of the invention could operate independently of whether a standard screw pattern is provided.

Figure 5:
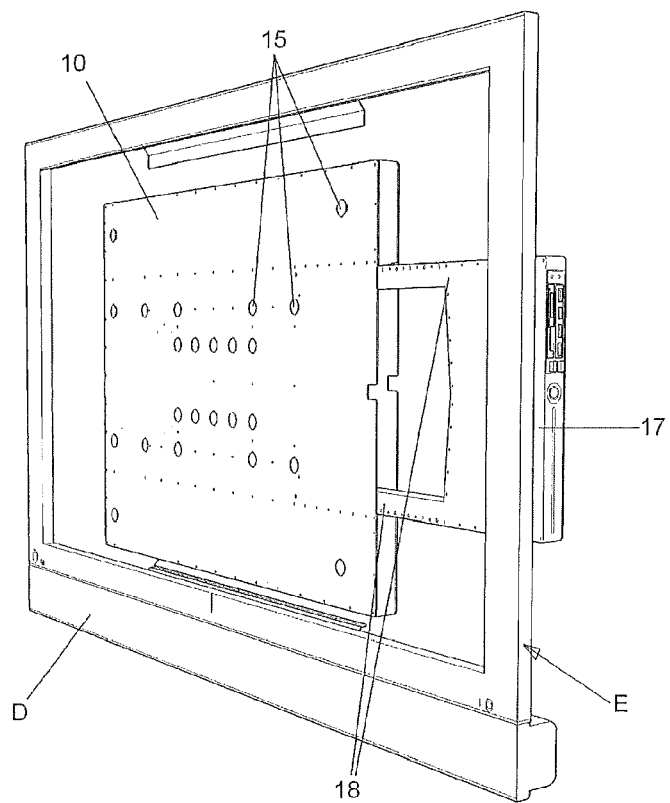
FIG. 5 shows a front perspective view of a flat panel display, with a device according to FIG. 4 mounted behind it.
Figure 6:
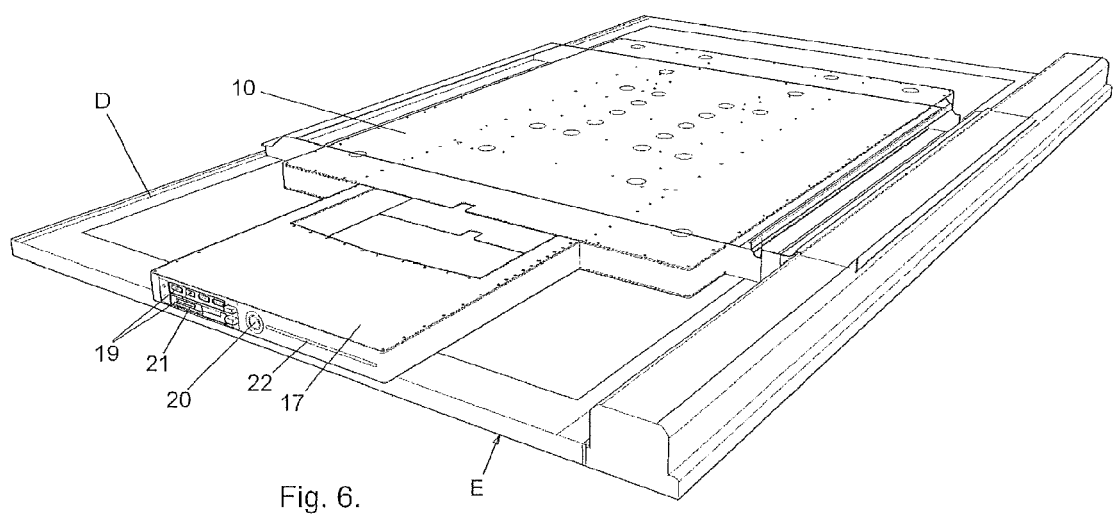
FIG. 6 shows a rear perspective view.

The advantage of the retractable means is best illustrated by FIGS. 5 and 6 wherein a large flat panel display D is shown.

A housing 10 according to the invention is illustrated in ghost view behind the display D wherein retractable tray 17 can extend to or beyond an edge E for access. As such it is possible to keep all the main functionalities accessible for a computer system or other electronic device mounted to the rear of the display D, even when the display itself is much wider than housing 10.

As shown in FIG. 6, with arms 18 extended to match the TV width, tray 17 can include a USB port 19, an on/off button 20, a flash memory card reader 21 and/or a media player disc slot 22 (Blu-Ray®, DVD, CD-ROM etc). The complete device in housing 10 may be a full featured desktop type computer with graphic and sound cards, hard drives, motherboard and processor and various other peripherals attachable by USB or other connections. The device will generally be configured for entertainment purposes and may include a Media Player and/or internet connection.

Figure 7:
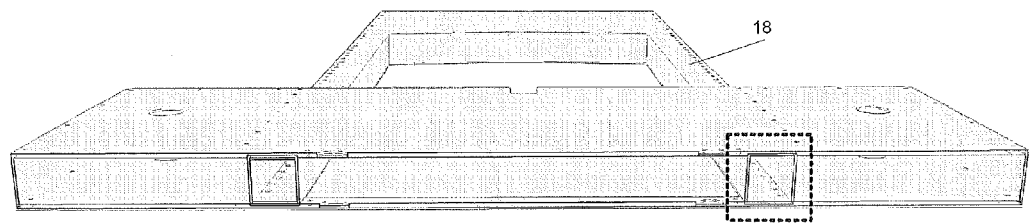
FIG. 7 shows a perspective view of a sliding mechanism.

FIG. 7 illustrates a simple form of sliding mechanism, using no bearing or motor (which could be optionally provided). In this embodiment (and as illustrated in FIGS. 5 and 6) the housing enclosure is not intended to be adjusted frequently hence the focus is to provide a design that can be free moving but is otherwise a tight fit in order to eliminate vibration coming from rotation of the optical media device components.

In FIG. 8 the configuration of a simple sliding mechanism is visible, namely the panel legs 18 sliding between two layers of aluminium 23 that add an extra thickness to the housing walls 11 and 12. A laser cutting process gives a margin of 0.1 mm providing enough clearance for the tubing to slide while maintaining a tight fit.

FIG. 8 also shows a path 24 for a screw to pass through the housing and arms 18 to lock tray 17 in place with the chassis, once a desired width (extension) has been reached. In a practical sense this screw operation would be performed only when first setting up the device with the display D. It would probably not need adjusting again until the display was upgraded.

Figure 9:
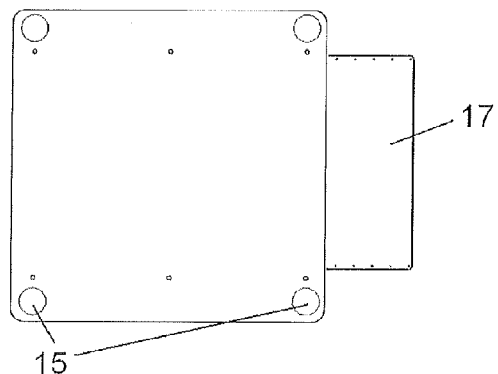
FIG. 9 shows an alternative configuration of the housing.
Figure 10:
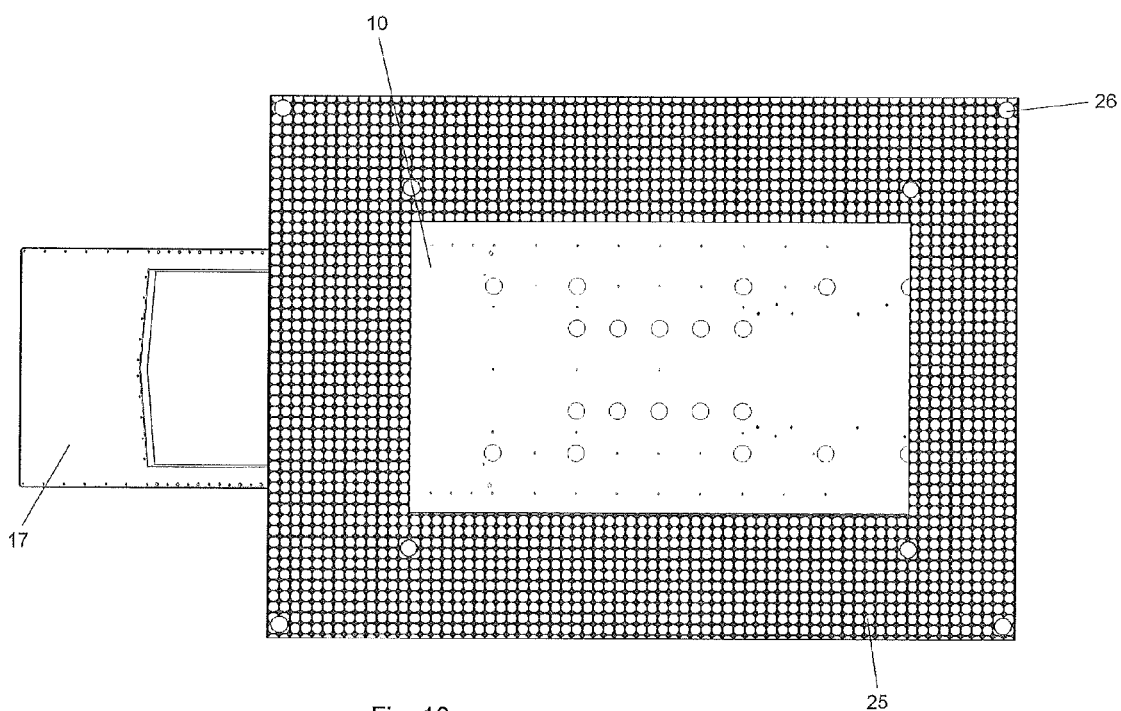
FIG. 10 shows a further alternative embodiment.

FIGS. 9 and 10 illustrate alternative embodiments of the housing.

FIG. 9 shows a smaller model that could easily be fitted to a large number of screen sizes, while retaining the FDMI mount compatibility. As it has already been developed by the industry, plates can be used to provide compatibility between VESA and proprietary mounting holes.

FIG. 10 illustrates an extension plate 25 that substantially surrounds housing 10 to upsize for a larger screen that may have mounting holes 26 toward an outer edge.

The function of the retractable means is its accessibility and it will be apparent to someone skilled in the art that what is illustrated in the Figures as a tray 17 can take many forms that perform this function.

INDUSTRIAL APPLICABILITY

The present invention can be manufactured from available materials using known processes. Housing 10 could be pressed from sheet metal or moulded from plastics where billets 16 may be integral with the walls 11 and/or 12. Retractable means 17 may have a variety of forms to enable it to extend for access, including being motorised.

The invention claimed is:

1. A device for mounting behind a flat panel display, an extendable bay in said device, said extendable bay being extendable for location at or beyond a peripheral edge of the flat panel display such that it remains accessible for operation by a user at or beyond the peripheral edge of the flat panel display when the flat panel display is mounted, electronic devices being mounted on said bay, and said bay being movable into and out of said device between two different positions with one of said positions being at or beyond the peripheral edge of the flat panel display and the other of said positions being behind the flat panel display.

2. The device of claim 1 wherein the extendable bay is adapted to be fixed in place after being extended.

3. The device of claim 1 wherein the extendable bay slides into and/or out of the device with a spring bias.

4. The device of claim 1 wherein the extendable bay is extendable for use and retractable for storage into the device.

5. The device of claim 4 wherein the extendable bay includes connection ports, media devices and/or a power switch apparatus.

6. The device of claim 1, wherein the device has a VESA-FDMI hole pattern to enable attachment between the flat panel display and a mounting surface.

7. The device of claim 6 wherein the device includes first and second opposing walls, each having the VESA-FDMI hole pattern, the VESA-FDMI hole pattern of the first wall matching the VESA-FDMI hole pattern of the second wall to permit fasteners therethrough the device, enabling the flat panel display to be attached to the mounting surface.

8. The device of claim 7 including a billet acting as a supporting interface around each hole of the VESA-FDMI pattern.

9. The device of claim 1, further provided with an extension plate about a periphery of the device.

* * * * *